Inventor:
Robert H. Park.
by Emery, Booth, Varney & Townsend
Attys

June 30, 1936.  R. H. PARK  2,045,673
ELECTRIC COOKING APPARATUS
Filed May 1, 1934   3 Sheets-Sheet 2

Inventor:
Robert H. Park,
by *[signature]*
Attys.

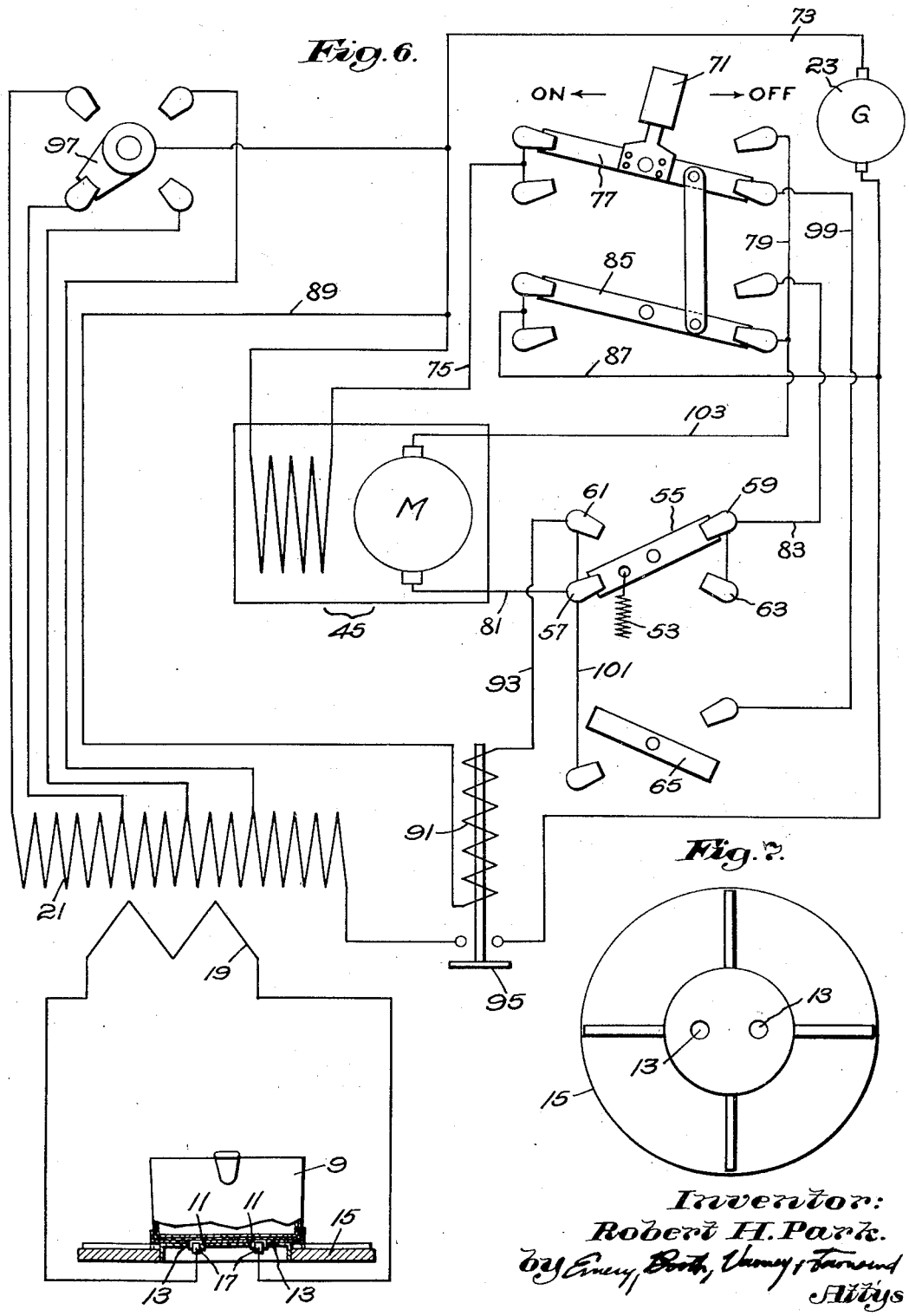

Patented June 30, 1936

2,045,673

UNITED STATES PATENT OFFICE 2,045,673

ELECTRIC COOKING APPARATUS

Robert H. Park, Bound Brook, N. J.

Application May 1, 1934, Serial No. 723,317

8 Claims. (Cl. 219—20)

This invention relates to an electric cooking apparatus of the type wherein the object to be heated, for example, a liquid containing vessel, is included as a part of an electric circuit to be heated by a resistance formed by or incorporated in the body of the vessel, preferably by a circuit of high amperage and low voltage. The object is to provide a convenient and efficient mechanism of this nature well adapted for domestic use.

My invention may be understood by reference to the following description of the illustrative embodiment thereof shown by way of example in the accompanying drawings, wherein:—

Fig. 6 is a wiring diagram; and

Fig. 7 is a plan view of a portion of the stove top on which the cooking vessel rests.

Figure 1:
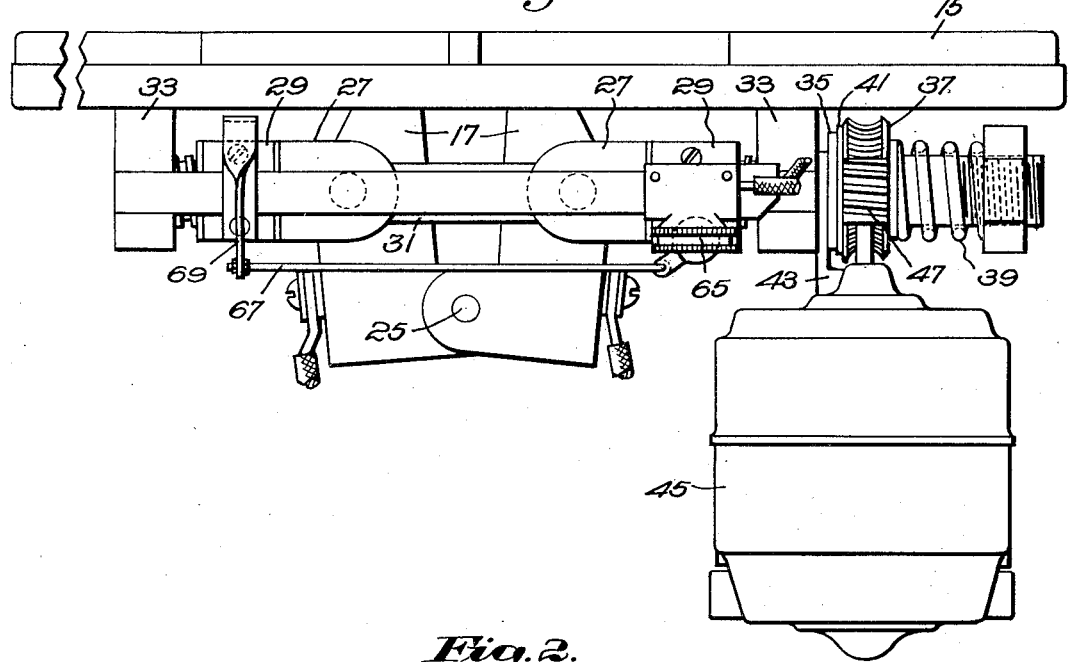
Fig. 1 is a side elevation of essential mechanical elements of the device.

Referring to Fig. 6 of the drawings, I have there shown a cooking vessel 9 having prong-like contacts 11 projecting from the bottom thereof which are adapted to pass through openings 13 (Fig. 7) in the stove top 15 to be engaged by the jaws 17 of suitable clamps, hereinafter to be more fully described, located beneath the stove top 15 whereby the vessel is included as a part of a secondary circuit 19 of high amperage and low voltage energized from the primary circuit 21, which is energized from a suitable source of current supply herein diagramed as a generator 23 and which may be the ordinary house wiring system. The construction so far described is essentially like that disclosed in my prior application Serial No. 580,533, filed Dec. 12, 1931, which matured into Patent No. 2,012,618. The present invention more particularly relates to the means for operating the clamping jaws 17 and for coordinately controlling the system electrically. The embodiment of the invention shown likewise follows the former application in that the clamping jaws are power operated and the arrangement is such that the heating circuit is energized only after the clamps close and conversely is interrupted before they separate.

Figure 4:
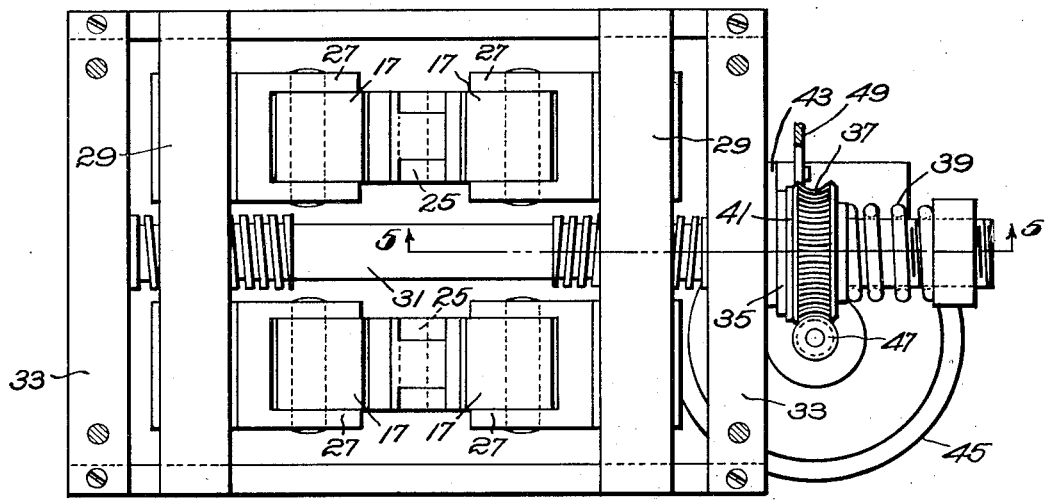
Fig. 4 is a plan view with the stove top removed and certain switches omitted.
Figure 5:
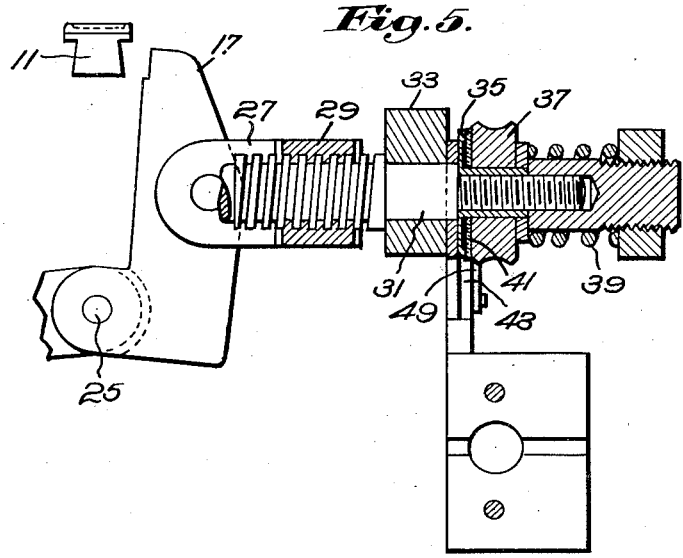
Fig. 5 is a section on the line 5—5 of Fig. 4.

Referring now more particularly to Figs. 1 and 4, there is provided for each contact 11 a pair of clamp jaws 17 which may be pivoted together at 25 and which have a normally open position as shown in the figures providing a suitable clearance between them permitting the contact 11 of the vessel to be freely placed therebetween as indicated in Fig. 5. The jaws of each pair are swung together to close on the contact. Herein the jaws are carried by yokes 27 which are attached with suitable interposed insulation to the cross-bars 29 extending between the homologous jaws of the two pairs. These cross-bars are threaded with right and left hand threads respectively to receive the corresponding threads of a shaft 31 journalled in the frame end members 33. If the shaft is turned in one direction, the clamp jaws will be drawn together from the position shown in the figures to close upon the interposed contacts depending from the cooking vessel, and when turned in the other direction they open from the closed position to that shown in the drawings. For operating the shaft 31 (see Figs. 4 and 5) it has fixed thereto a radially extending plate 35 against which a worm wheel 37 loose on the shaft is pressed by spring 39, a leather washer 41 being interposed between the worm wheel and the disc to provide a yieldable friction clutch. Freely pivoted on the shaft is an arm 43 which supports a small electric motor 45, herein of the reversible type, the rotor of which carries a worm 47 gearing with the worm wheel 37. It will be understood that if the parts are in the position shown in Fig. 2 and the motor is energized to rotate the worm wheel 37 counterclockwise viewing that figure, it will rotate shaft 31 to draw together the clamp jaws on the intervening contact 11. When the jaws are closed in a firm gripping engagement on the contact, if the motor continues to run the wheel 37 will tend to remain stationary and the motor will swing bodily about the shaft as a center, the worm 47 climbing clockwise about the wheel. In other words, the construction is a form of yielding, slipping or lost motion drive in which the yield or slip occurs by movement of the driver, herein of the motor as a whole. If thereafter the motor is stopped by interruption of the energizing current, it will remain in the elevated position because of the self-locking nature of a worm and worm wheel. If the rotation of the motor is reversed it will bodily resume the position shown in Fig. 2 and will also rotate the shaft 31 in a direction to open the clamps.

Figure 2:
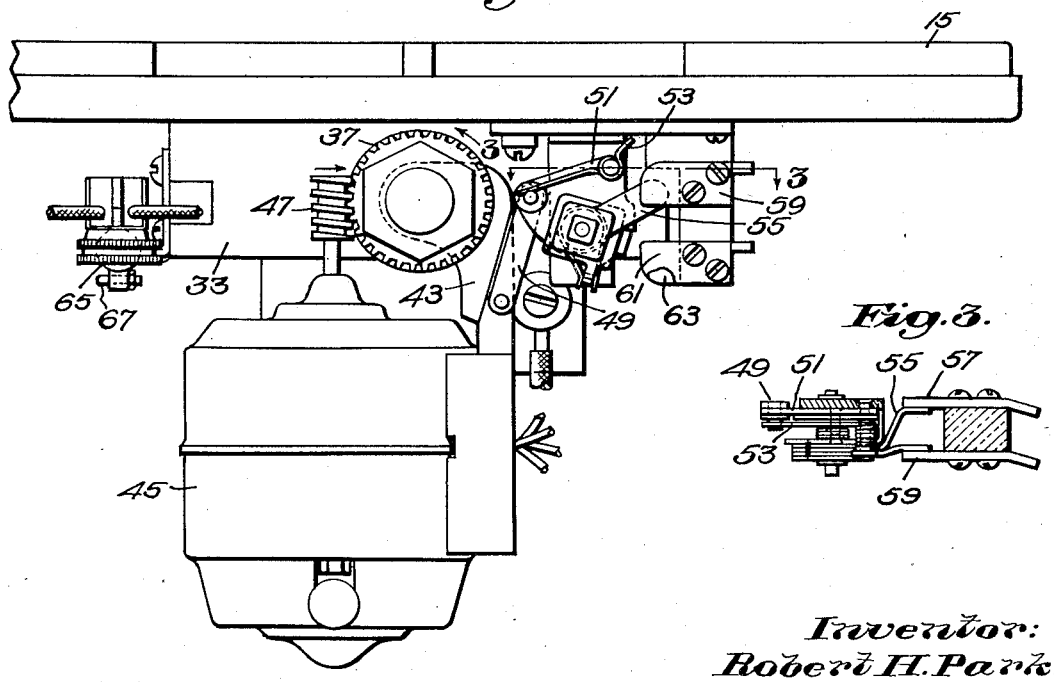
Fig. 2 is an end view as seen from the right of Fig. 1.
Figure 3:
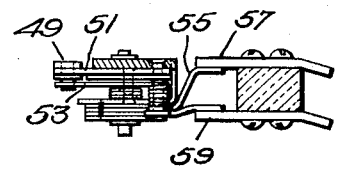
Fig. 3 is a section on the line 3—3 of Fig. 2.

Before considering the electrical control of the mechanism just described I shall first describe certain switch mechanisms which are utilized. Referring to Fig. 2, it will be seen that the arm 43 which supports the motor 45 and which is swung when the motor shifts itself bodily in the manner just described is connected by a link 49 to a lever 51 normally pressed by a spring 53 to the position shown in Fig. 2 and which, preferably through a snap-acting mechanism unnecessary to describe in detail, controls the position of switch bridge 55. This bridge under the action of the spring 53 normally has the position shown in Fig. 2 connecting contacts 57 and 59, but when the motor swings counterclockwise viewing Fig. 2, link 49 operates lever 51 against the force of the spring and moves the bridge to connect the corresponding lower pair of contacts 61 and 63.

A switch 65, which may be of the well known snap-acting toggle type commonly utilized on small portable motor-driven devices, electric lamps, radios and the like, and unnecessary to illustrate in detail, is carried by one of the cross-bars 29 and is operated by a connecting rod 67 secured to the other cross-bar 29 by an elastic connection here shown in the form of a bent strip of flat steel 69 of suitable length to provide the combination of elasticity and stiffness desired. The arrangement is such that the switch 65 is thrown as the jaws move inwardly toward one another and as they recede from one another toward their open position and the elastic connection is provided to permit motion of the clamps after the switch has been operated to avoid deformation of the switch or of the connecting rod.

Referring now to the wiring diagram, Fig. 6, the heating mechanism or stove as a whole may be controlled by a hand-operated switch 71 of the double pole, double throw type. In Fig. 6 switch 71 is in the off position and all the parts are in the position they would assume when the stove was not in use. The vessel 9 may now be positioned on the stove top 15, the contacts 11 passing through the openings 13 into the unobstructed clearance space provided between the clamp jaws 17 which are in the position shown, for example, in Fig. 1. The switch 71 may now be moved to the on position. Motor 45 is then energized through the following circuit:—conductor 73 to the field of the motor, conductor 75 to the upper bridge 77 of switch 71, conductor 79 to the motor armature, conductor 81 to contact 57, switch bridge 55, contact 59, conductor 83 to the lower bridge 85 of the switch 71, now in the opposite position from that shown in the drawings, and conductor 87 to the opposite side of the line. As the motor is energized the clamps move toward closed position and relatively early in this movement switch 65 (shown open in Fig. 6 in the diagram) is closed. The clamps close firmly on the contacts 11 and movement of the worm wheel 37 is checked as this takes place and the motor 45 swings itself upwardly bodily as described above, and as this bodily motion takes place switch 55 is shifted from the position shown in the drawings to connect contacts 61 and 63. This, it will be seen, immediately breaks the motor circuit above described. The motor ceases to rotate but remains in the extreme position because of the locking character of a worm and worm wheel. The shifting of the switch 55 also closes the following circuit:—conductor 73, conductor 89 to the solenoid coil 91, conductor 93, contact 61, switch bridge 63, contacts 63 and 59 which are electrically connected, conductor 83, lower bridge 85 of the main switch, and conductor 87 to the opposite side of the line. Energization of the solenoid 91 operates to raise bridge 95 and close the circuit of primary transformer coil 21, energizing secondary coil 19 and initiating the heating operation. Thus the shifting of the switch 55 immediately closes the heating circuit. The intensity of the heat may be controlled in usual manner by a tap selector switch 97 shown at the upper left hand portion of the diagram.

Cooking now proceeds and when it is completed main switch 71 is shifted to the off position shown in the drawings. This immediately breaks the circuit of the solenoid coil 91 at the lower bridge 85 interrupting the heating circuit. Nominally at the same time but actually somewhat later because of the time required for acceleration, the motor is energized through the following reversing circuit:—conductor 73 to the field of the motor, conductor 75, upper bridge 77, conductor 99, switch 65 which has been closed as described above, conductors 101 and 81 to the motor armature, conductor 103 to lower bridge 85 of main switch 71, and conductor 87 to the opposite side of the line. The motor armature rotates in a direction opposite to that in which it moved in closing the clamps, opening the clamps and the motor itself returning to the normal position shown in Fig. 2, permitting switch 29 to return to its initial position shown in Figs. 2 and 6 under the action of spring 53. The switch mechanism and the connections thereto serve as a stop preventing the motor from swinging counter-clockwise beyond the vertical, viewing Fig. 2. As the clamp jaws approach their open position, switch 65 will be opened, deenergizing the motor, and all parts will have returned to the position shown in Fig. 6 ready for the initiation of a new cycle.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In an electric cooking device comprising movable clamps for gripping contacts on a device to be heated to include the same in an electric circuit, a shaft having a right and left screw for opening and closing said clamps, a worm wheel on the shaft, a motor pivoted to swing about the shaft having a worm for driving the wheel and a switch for the circuit adapted for operation by rotation of the motor about the worm wheel.

2. An electric cooking device comprising movable clamps for gripping contacts on a device to be heated to include the same in an electric circuit, a motor having a yieldable driving relation to said clamps for closing the same and switch means operating responsively to the yielding of the drive for energizing the circuit.

3. An electric cooking device comprising movable clamps for gripping contacts on a device to be heated to include the same in an electric circuit, a motor mounted for bodily movement and having a driving connection with said clamps for closing the same and switch means operated by the bodily movement of said motor for energizing the circuit.

4. An electric cooking device comprising movable clamps for gripping contacts on a device to be heated to include the same in an electric circuit, a reversibly acting operating means for closing and opening said clamps, a motor having driving connection to said operating means permitting continued operation of the motor after the clamps have closed to further move the parts of said connection to a self-maintaining extreme position, and a switch for the heating circuit operating by movement of the parts to said extreme position.

5. An electric cooking device comprising movable clamps for gripping contacts on a device to be heated to include the same in an electric circuit, a reversibly acting operating means for closing and opening said clamps, a motor having driving connection to said operating means permitting continued operation of the motor after the clamps have closed to further move the parts of said connection to a self-maintaining extreme position, a main switch having an "on" position energizing the motor for closing the clamps, switch means operating on movement of the parts to said extreme position for energizing the heating circuit and deenergizing the motor, said main switch having an "off" position breaking the heating circuit and effecting a reversed drive of said operating means by the motor, and a switch operated by movement of the clamps to open position to break the motor circuit.

6. An electric cooking device comprising movable clamps for gripping contacts on a device to be heated to include the same in an electric circuit, a reversibly acting operating means for closing and opening the clamps, a reversible electric motor having a yieldable driving relation to said operating means, a main switch having an "on" position energizing the motor in clamp-closing direction, switch means responsive to continued running of the motor after the clamps have closed energizing the heating circuit and deenergizing the motor, said main switch having an "off" position breaking the heating circuit and closing a reversing circuit for the motor, and a switch in the reversing circuit closed and opened respectively on movement of the clamps from and return of the same to their open position.

7. An electric cooking device comprising pairs of relatively movable clamp jaws for gripping contacts on a device to be heated to include the same in an electric circuit extending from one pair to another, double-acting means for closing and opening the clamps, a reversible electric motor for actuating said means, and manually operable means responsive to independent operations for causing rotation of the motor in opposite directions and controlling conjointly the energization of the motor and the heating circuit and arranged to permit completion of the latter only after the clamps have closed.

8. An electric cooking device comprising pairs of relatively movable clamp jaws for gripping contacts on a device to be heated to include the same in an electric circuit extending from one pair to another, double-acting means for closing and opening the clamps, a reversible electric motor for actuating said means, and manually operable means responsive to independent operations for causing rotation of the motor in opposite directions and controlling conjointly the energization of the motor and the heating circuit and arranged to permit completion of the latter only after the clamps have closed and to interrupt the latter before the clamps open.

ROBERT H. PARK.